United States Patent [19]

McDermott

[11] Patent Number: 5,901,699

[45] Date of Patent: May 11, 1999

[54] HEAT RETENTIVE FOOD SERVICE BASE

[75] Inventor: Michael B. McDermott, Washington, Mo.

[73] Assignee: Seco Products Corporation, Washington, Mo.

[21] Appl. No.: 08/796,941

[22] Filed: Feb. 7, 1997

Related U.S. Application Data

[63] Continuation-in-part of application No. 08/530,004, Sep. 19, 1995, Pat. No. 5,611,328.

[51] Int. Cl.$^6$ .................................................. A47G 23/04
[52] U.S. Cl. ......................... 126/246; 126/275; 126/400; 165/10
[58] Field of Search ...................................... 126/246, 400, 126/275, 375; 165/10; 219/620, 621, 649; 99/451, DIG. 14

[56] References Cited

U.S. PATENT DOCUMENTS

| | | | |
|---|---|---|---|
| 1,330,209 | 2/1920 | Massing . | |
| 2,876,634 | 3/1959 | Zimmerman et al. | 62/457 |
| 3,054,395 | 9/1962 | Torino | 126/375 |
| 3,065,744 | 11/1962 | Scavullo | 126/246 |
| 3,148,676 | 9/1964 | Truog et al. | 126/246 |
| 3,557,774 | 1/1971 | Kreis | 126/246 |
| 3,766,975 | 10/1973 | Todd | 165/74 |
| 3,837,330 | 9/1974 | Lanigan et al. | 126/246 |
| 3,875,370 | 4/1975 | Williams | 219/386 |
| 4,059,096 | 11/1977 | Schneider | 126/375 |
| 4,086,907 | 5/1978 | Rothschild | 126/246 |
| 4,246,884 | 1/1981 | Vandas | 126/246 |
| 4,505,252 | 3/1985 | Wada et al. | 126/246 |
| 4,567,877 | 2/1986 | Sepahpur | 126/246 |
| 4,777,931 | 10/1988 | Ziegler et al. | 126/246 |
| 4,982,722 | 1/1991 | Wyatt | 126/400 |
| 5,052,369 | 10/1991 | Johnson | 126/400 |
| 5,125,391 | 6/1992 | Srivastava et al. | 126/246 |
| 5,417,276 | 5/1995 | Dobry | 165/10 |
| 5,603,858 | 2/1997 | Wyatt et al. | 219/620 |
| 5,611,328 | 3/1997 | McDermott | 126/246 |

OTHER PUBLICATIONS

Product line catalog for Therma–Systems Corporation, South Plainsfield, New Jersey.

*Primary Examiner*—Larry Jones
*Attorney, Agent, or Firm*—Herzog, Crebs & McGhee, LLP

[57] ABSTRACT

A one-piece, seamless food service base is insert molded from a heat and impact resistant plastic. The base is shaped to receive a standard serving plate and includes an integrally molded core. The core is made from a metal or other material that is susceptible to heating through induction heating. In one form, the core is a solid metal disk with strategically disposed bores for molding the base. In another from, the core is a hollow metal disk having a standard wax phase change core. Insulation may also be added above and/or below the core to improve heat transfer and to keep the bottom of the unit cool. In another form, the core is made of graphite and may even be mixed with ceramic to form a composite which may be used for the entire base, alleviating the need for insert molding a separate core and base.

9 Claims, 5 Drawing Sheets

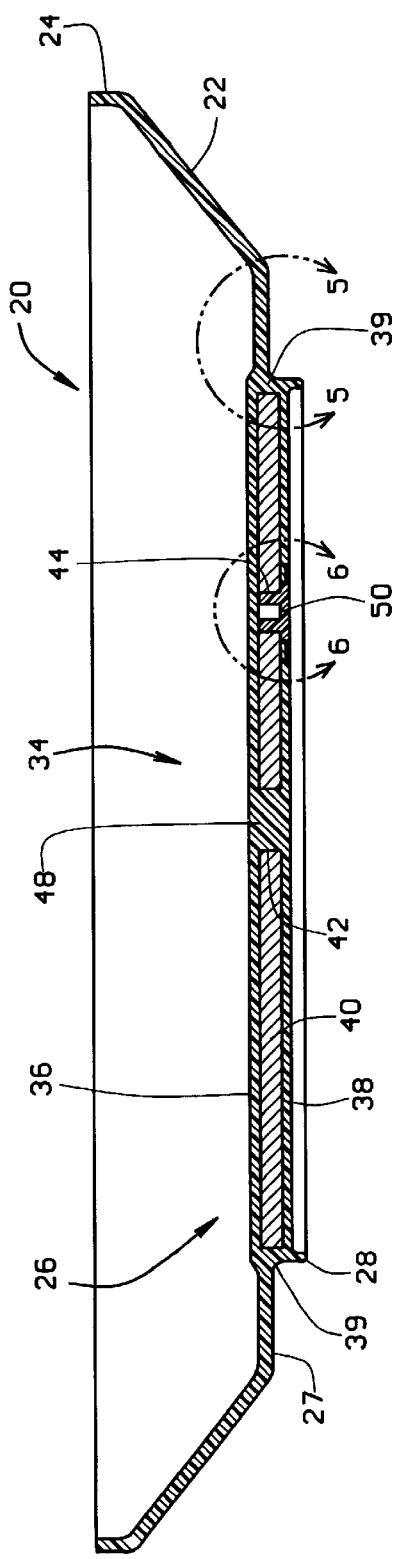
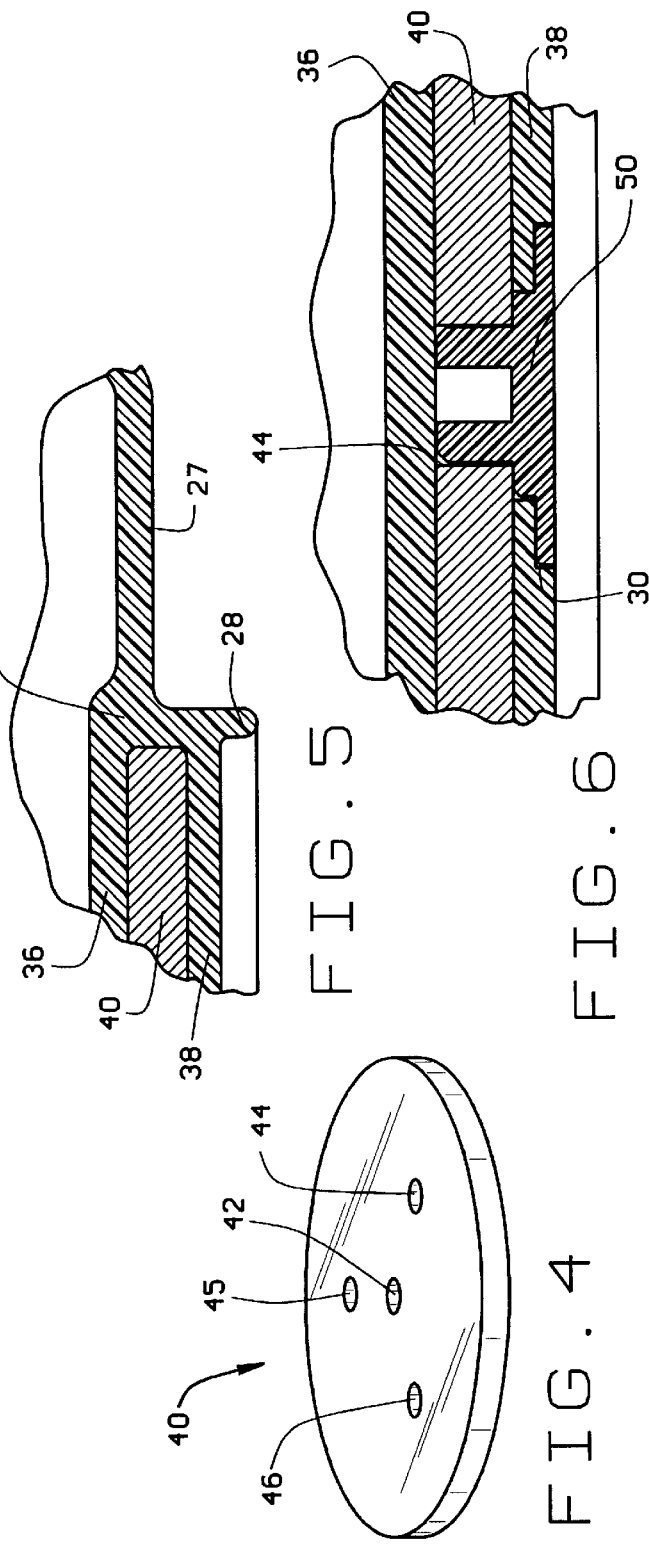

5,901,699

HEAT RETENTIVE FOOD SERVICE BASE

This is a continuation-in-part of U.S. patent application Ser. No. 08/530,004 filed Sep. 19, 1995 entitled HEAT RETENTIVE FOOD SERVICE BASE, now U.S. Pat. No. 5,611,328 issued Mar. 18, 1997.

FIELD OF THE INVENTION

The present invention relates generally to heat retaining food service containers for keeping food thereon warm prior to service and, more particularly, to heat retentive bases for maintaining a plate with food thereon warm for a period of time.

BACKGROUND OF THE INVENTION

Institutional environments such as hospitals and nursing homes, hotels, banquet halls, and the like all have food service operations that require the use of devices to maintain the prepared food warm after its preparation and before service. Generally, the kitchen for these types of places is in a location that is remote from the patients or people and thus the food needs to be transported from the remote location to the patients or people. In many instances the length of time between the preparation of the food and the serving of the food may be upwards of one hour. In some cases, it has been found desirable to prepare the meals well in advance of serving.

Obviously, it is desirable to maintain the heated food warm until it is served. To this end, there have been developed essentially three types of devices for maintaining the food warm from the time of preparation until the time of service. One way is termed rethermalization. In rethermalization the food is placed on plates on a tray, with the tray placed within a metal cabinet. The cabinet includes heating pads for each tray that correspond in location to the food to be heated on the tray. The entire meal is placed on the tray with a plurality of trays stored in the cabinet. The cabinet is stored in a refrigerator unit until it is time to reheat and serve the meal. A heater control coupled to the cabinet and heating pads is activated to heat only the food on the warming pads thereby keeping the remaining food cold. The heating is accomplished while the cabinet is within the refrigerator unit. Once the rethermalization cabinet has been removed from the refrigerator unit, there is no more heating of the food. Therefore, depending on the time out of the refrigerator and the distance to each and the last patient, the food can cool down. Therefore, such cabinets are of limited effectiveness.

Another way is to provide an insulated container, generally consisting of an insulated base or tray with an insulated cover therefor. A plate with heated food is placed on the previously insulated base with the cover placed thereover. The heat from the heated food maintains the food warm within the insulated cover. These devices are effective for generally short periods of tine and only moderately effective for longer periods of time.

Yet another type of device in use is a heatable base that is likened to a heat sink. This type of device is effective when all of the food on the plate is to be kept warm. The base is heated to a sufficient temperature whereupon a plate with prepared food is placed upon the heated base and a cover placed thereover. The base is placed in a convection type heating unit or oven to sufficiently heat the base. The core of the base includes what is known as a phase change material that absorbs heat when heated, and which slowly dissipated the heat thereafter. The dissipating heat is transmitted to the plate situated thereon to keep the food warm. Generally, a cover is placed over the plate that mates with the base.

Prior art heatable bases have included such phase change materials as pure wax, solid phase change materials, and bladders carrying such materials. In the prior art these bases have been manufactured from plastic and stainless steel. Such bases are exemplified in the following U.S. Pat. Ser. Nos.: 2,876,634 issued Mar. 10, 1959 to Zimmerman et al.; 3,054,395 issued Sep. 18, 1962 to Torino, 3,065,744 issued Nov. 27, 1962 to Scavallo; 3,148,676 issued Sep. 15, 1964 to Truog et al.; 3,557,774 issued in 1969 to Kreis; 3,837,330 issued Sep. 24, 1974 to Lanigan et al; 3,874,370 issued Apr. 1, 1975 to Williams; 4,059,096 issued Nov. 22, 1977; 4,086,907 issued May 2, 1978 to Rothschild; 4,246,884 issued Jan. 27, 1981 to Vandas; 4,505,252 issued Mar. 19, 1985 to Wada et al.; 4,567,877 issued Feb. 4, 1984 to Sepahpan; 4,777,931 issued Oct. 18, 1988 to Ziegler et al; 4,982,722 issued Jan. 8, 1991 to Wyatt; and 5,125,391 issued Jun. 30, 1992 to Srivastava et al. However, stainless steel is quite objectionable in that stainless steel transfers its heat at a much quicker rate than plastic. Also, all of these bases must be heated by a convection type oven or heating unit which generally takes a fair amount of time to raise the temperature of the core of the base to a sufficient temperature. Furthermore, plastic is air permeable, which over time allows air to penetrate into the phase change material which reduces the life expectancy or use of the phase change material and the base. Also, such high convection temperatures that are necessary to raise the core to a proper temperature for maintenance of a specific low end or minimum temperature for a specific period of time anneals the plastic causing the plastic to become brittle and fail.

It is apparent from the foregoing that prior art food warmers are deficient in many respects. Thus, it is an object of the present invention to provide a heat retentive base for food plates that reduces the time necessary to sufficiently heat the base.

It is another object of the present invention to provide a food service base whose operation is not affected by time, air permeability, or repeated use cycling.

It is another object of the present invention to provide a food service base with a low overall weight.

It is yet another object of the present invention to provide a food service base that provides an even heat distribution to the food thereon, while keeping the bottom of unit cooler than the top of the unit.

SUMMARY OF THE INVENTION

In keeping with the above, the present invention is a heat retaining food service base for use with a plate carrying previously prepared food for maintaining the prepared food warm during an extended period of time.

In one form, the food service base comprises a plastic dish with an integral metal cone having characteristics making the core susceptible to induction heating. Preferably, the metal core is a solid disk fashioned from steel, however, other configurations and metals may be used. The plastic dish is formed around the metal core, preferably by insert molding to provide a one-piece, integral, no seam base.

The core is of sufficient mass to heat up to 425–450° F. in approximately ten to fifteen (10–15) seconds by a 2.5–3 kW induction heating unit. Thereafter, the heat acquired by the core slowly dissipates to the food on a plate held on the base. The core maintains heat down to 140° F. for a minimum time of thirty (30) minutes. The present mass of 0.9 pounds for a base that holds a standard 9" plate was sized to work with a 2.5–3 kW induction heater as the mass will take only ten to fifteen (10–15) seconds to heat to the temperature of 425–450° F. This is the approximate amount of time that a typical food preparation worker has to fix a plate of prepared food. Therefore, the present base is timed to accomplish sufficient heating in the time range. Such quick heating time will not heat up the edges of the base. Due to the quick heat-up cycle of the core, the outer shell is not subjected to excessive or prolonged temperatures that degrade the plastic shell. Such high temperatures encountered with ordinary prior art convection heated bases causes the majority of the failures. The solid core cannot by nature leak.

In forming the solid core service base the core is held in the molding position by several pins. The pins are received in apertures disposed in the core. While the core is held in place, the liquid plastic is introduced therearound to form the service base. A central bore in the core allows the liquid plastic to flow to the back side of the core for encasing the core within the service base and to form a wall that becomes the service base bottom. Thereafter, the pins are removed from the service base. Plastic plugs that fit into the core and base apertures are ultrasonically welded to the bottom of the base.

The solid core service base is heated by a suitable induction type heating unit. In this manner, the core is sufficiently heated to thereafter slowly dissipate its heat through the wall of the service base and adjacent the bottom of the plate into the plate and food thereon to maintain the warmth of the food.

In another form, a service base includes a hollow metal disk having a standard wax-type phase change core. The hollow metal disk is fashioned from a metal that is characteristically susceptible to heating by induction and preferably a magnetic metal. The phase change metal disk is inserted molded integral with the one-piece service base.

In like manner to the solid core service base, the phase change service base is heated by induction heating rather than by convection heating. During molding, magnetic pins hold the phase change disk. The service base may include a plurality of legs to allow the service bases to be stacked upon one another while leaving a minimum air space between bases. The one-piece insert molded plastic service base eliminates any type of stress on seams, joints, or failure points.

Another alternative core material is an electrically conductive, but non-metallic material such as graphite or a ceramic and graphite composite. Such materials can improve heat up time and reduce the weight of the unit.

To help promote even heating throughout the unit, a thin film of glass, approximately 1/32 inch thick, may be added between the core and the dish. Additionally or alternatively, a layer of insulation may be added between the core and the bottom of the service base to keep the bottom of the base cooler than the top of the base. This insulation can be made of glass or air and may optionally include a spacer between the insulation and the core.

In yet another embodiment, the dish may be made of a ceramic material, similar to a china plate. The core material may also be mixed with the ceramic material to form a single solid unit which is susceptible to induction heating.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings.

It is noted, however, that the appended drawings illustrate only several typical embodiments of this invention and is therefore not to be considered limiting of its scope, for the invention may admit to other equally effective embodiments. Reference the appended drawings, wherein:

FIG. 3 is a sectional view of the service base taken along line 3—3 of FIG. 1;

FIG. 4 is a perspective view of the metallic heat sink for the service base in accordance with the present invention;

FIG. 5 is an enlarged sectional view of the bottom edge of the service base taken along circle 5—5 of FIG. 3;

FIG. 6 is an enlarged sectional view of the bottom plug of the service base taken along circle 6—6 of FIG. 3;

DETAILED DESCRIPTION

Figure 1:
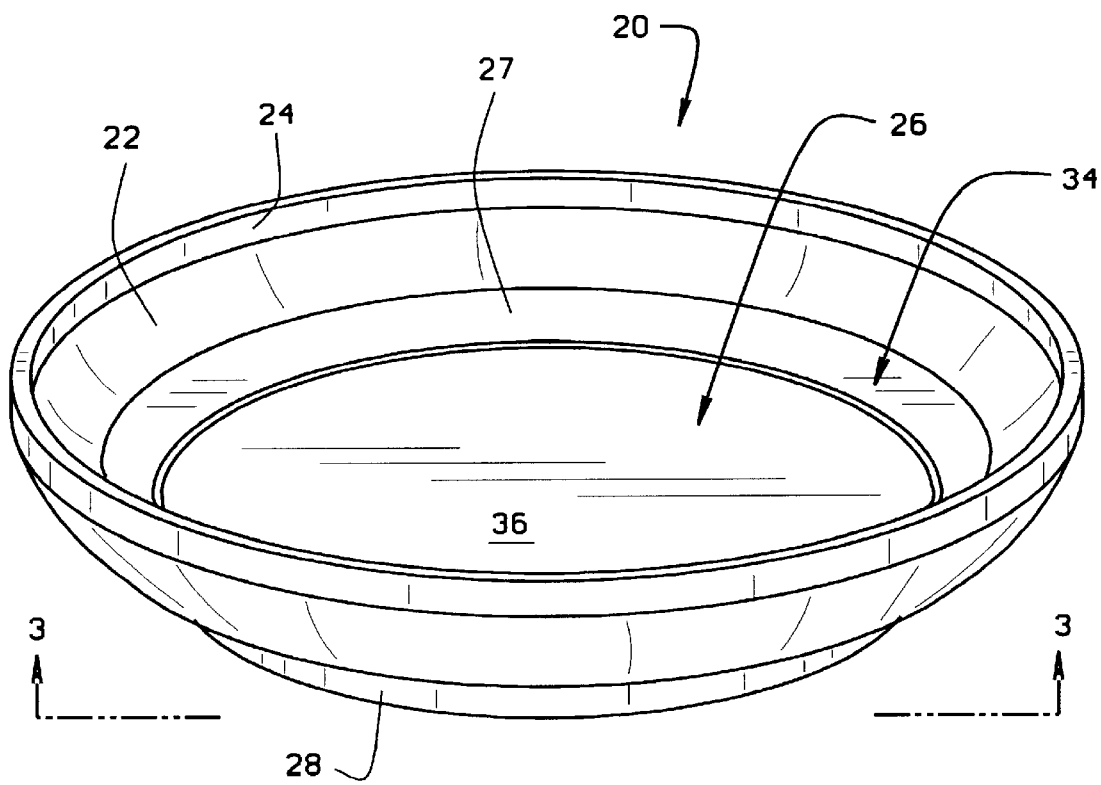
FIG. 1 is a top perspective view of a food service base embodying the present invention.
Figure 2:
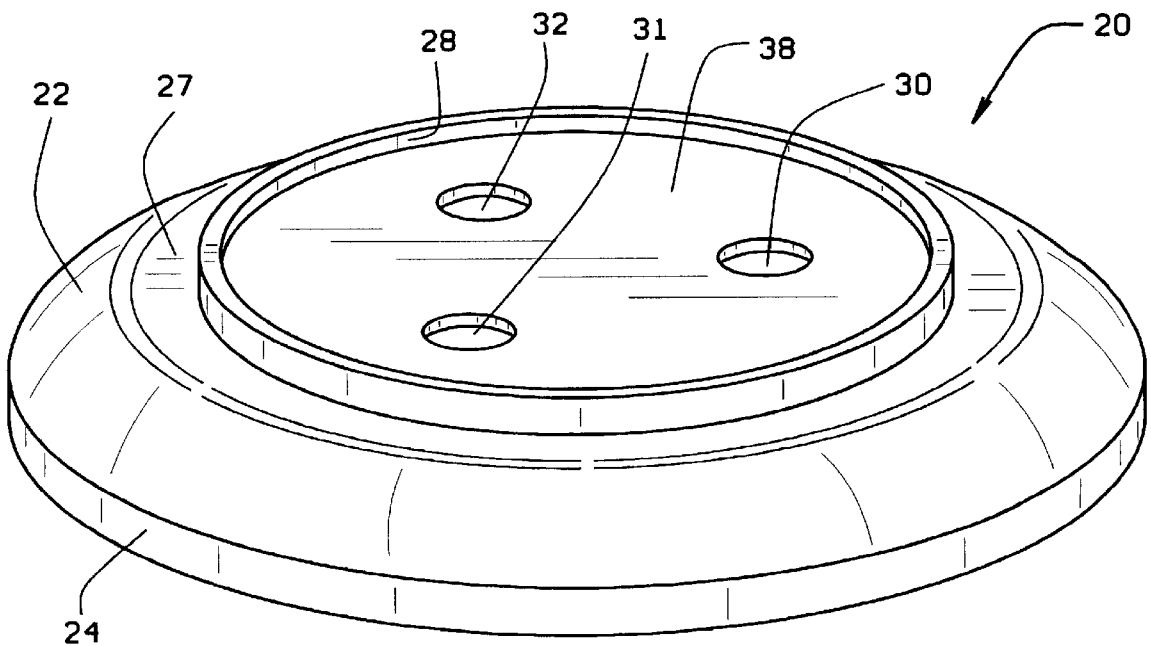
FIG. 2 is a bottom perspective view of the service base of FIG. 1.

Referring to FIGS. 1 and 2, a food service base 20 in accordance with the teachings of the present invention is shown. The food service base 20 is essentially "bowl-shaped" having an essentially flat bottom area having an upper bottom surface 36 that is annularly surrounded by a first or intermediate upwardly sloping wall 27 that is annularly surrounded by a second or main upwardly sloping wall 22. Disposed at the upper periphery of the wall 22 is an annular rim 24. Disposed at the underside of the base 20 extending from the bottom of the wall 27 is an annular bottom rim 28. The base 20 is designed to receive a standard serving plate, typically china, with the plate fitting into the cavity 34 defined by the bottom surface 26, annular walls 22, 27, and the upper rim 24. The bottom surface 36 is adjacent the bottom of the plate (not shown) when the plate is placed in the service base 20.

With reference to FIG. 3, the base 20 is shown in cross-section. It can be readily seen that the bottom area 26 consists of an upper bottom wall 36 and a lower bottom wall 38 separated by an annular transverse wall 39 that joins the intermediate wall 27. The upper and lower bottom walls 36, 38 respectively, and the annular side wall 39 define a cavity (not numbered) in which is disposed a core 40. The core 40 is formed integrally with the molding of the base 20 and is thus surrounded by the walls 36, 38 and 39. The base 20 is molded from a plastic such as Radel® polyphenylsulfone made by Amoco, a Stanyl Nylon 46, or an Ultem® made by GE. Other impact and high heat resistant engineered plastics may also be used. As shown in FIG. 2, the lower bottom surface 38 has three molding apertures 30, 31, 32 that are shown without plugs as a result of the molding process. It should be understood from the following that the molding apertures 30, 31, 32 are filled with plugs after the molding process is complete.

Referring to FIG. 4, the core 40 is shown. The core 40 is preferably a disk of sufficient mass and size to cover the bottom of a standard plate. The core is formed of a metal that is at least somewhat electrically conductive such that the core is susceptible to heating by an induction heating unit. The core 40 may be magnetic as well. The core 40 includes a center or central bore 42 and three disk apertures 44, 45, 46. The center bore 42 extends through the disk 40. The center bore 42 allows the liquid plastic during the molding process to flow behind the disk thereby forming the upper bottom wall 36 of the bottom area 26. The disk apertures 44, 45, 46 are for receipt of molding pins (not shown) integral with the mold for positioning the core before the actual molding for proper placement and alignment of the core 40 during molding of the service base 20. The disk apertures 44, 45, 46 may or may not extend through the disk 40. FIG. 5 shows the juncture of the wall 27 with the walls 36, 38, 39 and the bottom rim 28.

An alternative material may be used for the core 40 which is non-metallic. It must be at least electrically conductive and preferably electrically and magnetically conductive, so that it is still susceptible to induction heating. A material such as graphite or a graphite and ceramic composite may be used to lower overall weight of the unit while simultaneously improving the heat up time.

Because of the molding process as described herein below, the lower bottom wall 38 of the bottom area 26 of the base 20 has three openings 30, 31, 32 (FIG. 2) corresponding in location to the disk apertures 44, 45, and 46 although FIG. 3 shows only one such aperture 44. The molding pins (not shown) create the openings 30, 31, 32 when the pins are extracted after the molding process is complete.

Specifically referring in addition to FIG. 6, a plug 50 preferably of the same plastic material as the molded service base 20 is placed in the mold aperture 30 after the base 20 is released from the mold. The plug 50 extends through and into the disk aperture 44. The plug is preferably ultrasonically welded. It should be readily understood that a plug is also inserted and ultrasonically welded into the disk apertures 31 and 32.

The molding of the service base 20 is accomplished as follows. The disk 40 is supported via its disk apertures 44, 45, 46 on and by three pins (not shown) that extend from and are integral with the mold (not shown). The pins thus suspend the core 40 while liquid plastic is injected therearound as per the typical insert molding process. As stated above, some of the liquid plastic flows through the center bore 42 around the back of the core 40 to form the upper bottom wall 36. After formation of the service base 20, the mold and pins are removed thereby leaving the molding apertures 30, 31, and 32 as seen in FIG. 2. Thereafter, plugs 50 are ultrasonically welded into the base 20.

The service base 20 is designed to be heated by a suitable induction heating type unit wherein the core 20 may obtain a temperature of 450° F. within approximately ten to fifteen (10–15) seconds. This is accomplished by a 2.5–3 kW induction heating unit. The core 40 is designed such that it can hold heat for a minimum of thirty (30) minutes without going below 140° F. food temperature as per industry standards. The acquired heat by the base dissipates its heat upwards through the bottom of the base, through the plate and into the food thereon. It can thus be seen that the service base 20 is molded as one piece so as to eliminate any seams, joints, or failure points. The heat absorbed by the core 40 is dissipated through the plastic and into the plate with food thereon (not shown). It has been found that for a 9" plate a core of 0.9 pounds with a circular upper surface corresponding to the size of the bottom on the plate is sufficient.

Figure 7:
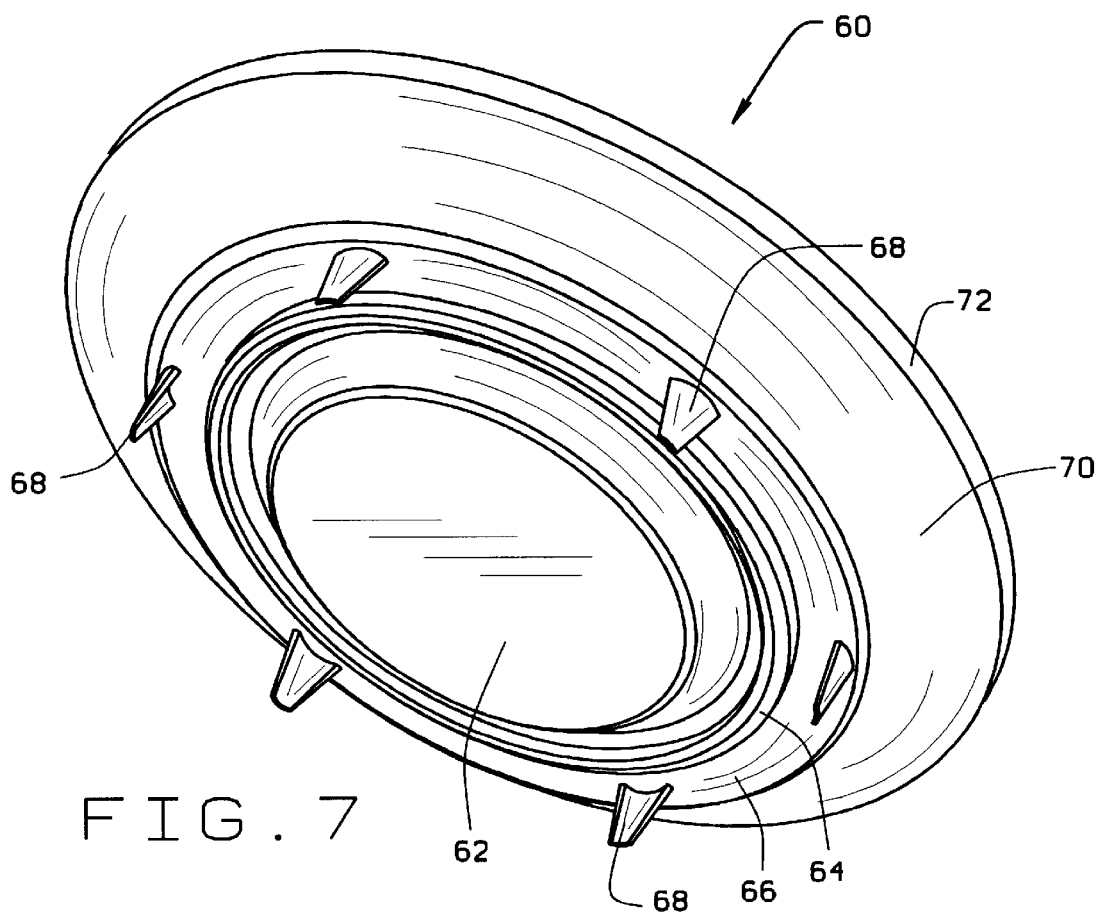
FIG. 7 is a bottom perspective view of a second embodiment of a food service base.
Figure 8:
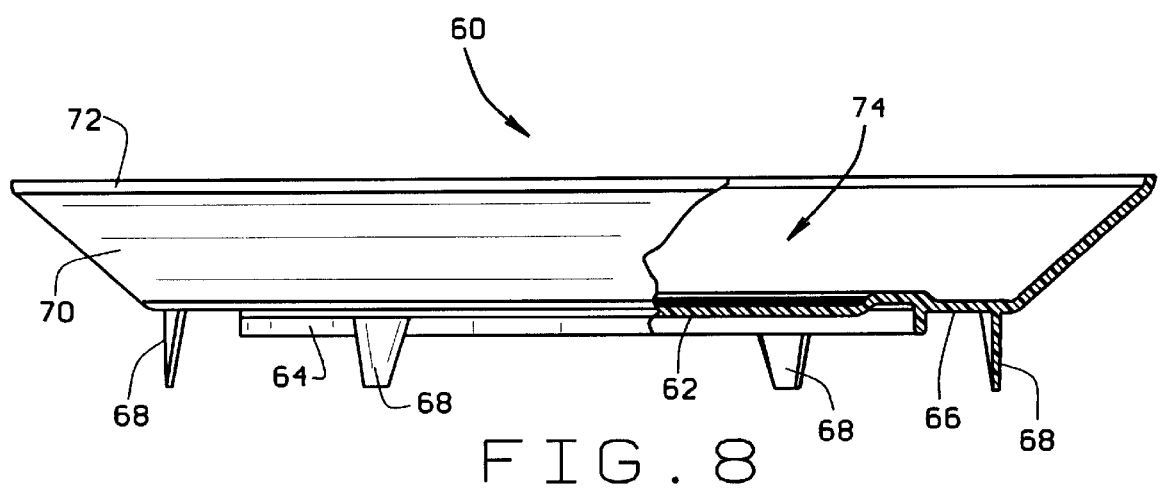
FIG. 8 is a side view in partial section of the service base of FIG. 7 without a core.

Referring now to FIGS. 7 and 8, there is shown an alternative service base generally designated 60. While the service base in FIGS. 7 and 8 does have a core, it is shown without a core for an understanding of the structure of the base 60. The base 60 again is essentially "bowl-shaped" and includes a bottom wall 62 having an annular downwardly extending rim 64 therearound. Radially extending about the rim 64 is an intermediate annular bottom wall portion 66. Extending form the underside of the wall 66 is a plurality of legs 68. Upwardly extending from the wall 66 is an annular angled wall 70 that terminates in an upstanding peripheral rim 72. Again, the base 60 is formed of a plastic such as Radel® from Amoco, Stanyl Nylon 46 , or an Ultem® from GE. Also, the base 60 is preferably insert molded. The walls 62, 70, 72 define an interior space 74 that is configured to receive a standard serving plate (not shown), with the bottom wall 62 designed to be adjacent the lower bottom surface of the plate.

Alternatively, the base 60 may be made of a ceramic similar to a china plate. If a graphite or graphite and ceramic composite is used as the core material, this would allow the core material to be premixed with the material used for the dish. Forming of the service base is then simplified as the base becomes a single solid unit, the core material being dispersed throughout the dish. The entire unit then becomes susceptible to induction heating.

Figure 9:
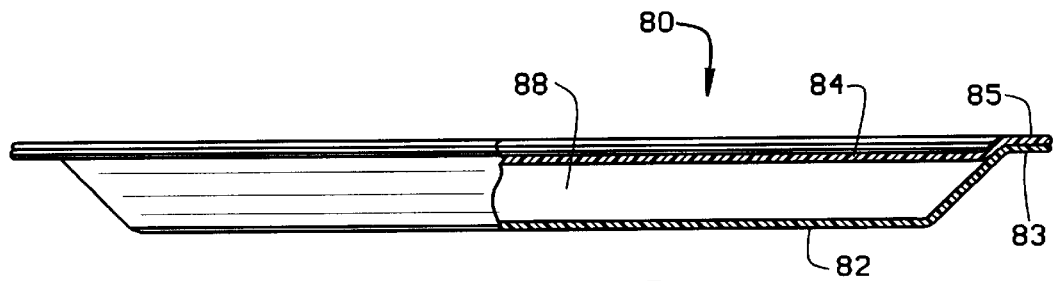
FIG. 9 is a front elevation view in partial section of the service base of FIGS. 7.

Referring to FIG. 9, a core 80 is shown. The core 80 consists of an upper and lower metal piece. The lower piece 82 is of a pie dish shape having a peripheral annular flange 83. The upper piece is a flat disk 84 also having a peripheral annular flange 85 that is adapted to meet and be sealed against the annular flange 83. The upper and lower walls 82 and 84 thus define an interior cavity 88 in which is received a standard wax phase change material (not shown). The walls 82, 84 of the core 80 are formed of a metal that is susceptible to induction heating, and is preferably a magnetic metal and electrically conductive. This allows the core 80 to be suspended in the mold during the molding process by magnetic pins (not shown).

Figure 10:
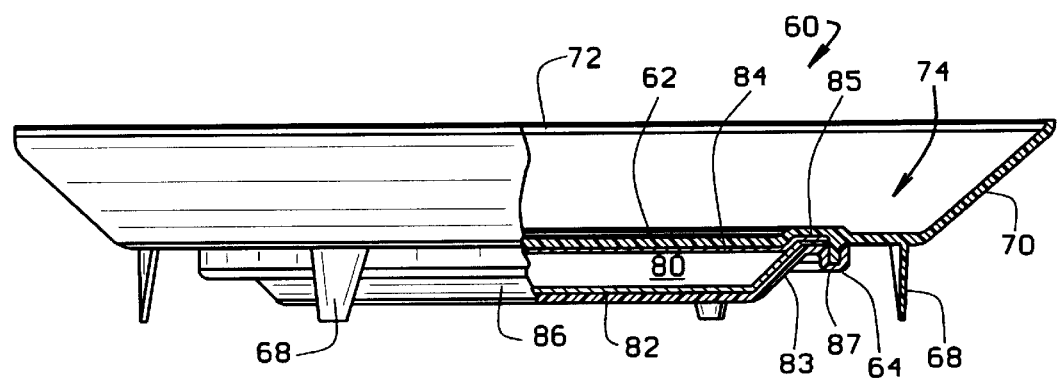
FIG. 10 is a front elevation view in partial section of the service base and core respectively of FIGS. 7 and 9.

Referring to FIG. 10, the core 80 is shown integrally molded into the base 60. The upper piece 84 is sized and adapted to be received against the bottom wall 62. Generally formed integrally with the base 60, as shown in FIG. 7, a lower wall 86 is formed around the lower piece 82 of the core 80 to follow the contours thereof. The lower wall 86 is integrally formed along with the rest of the base 60, and includes an annular "U" flange 87 that is adapted to be matingly received onto the rim 64. In this manner, the core 80 is entrained in the plastic base.

Figure 11:
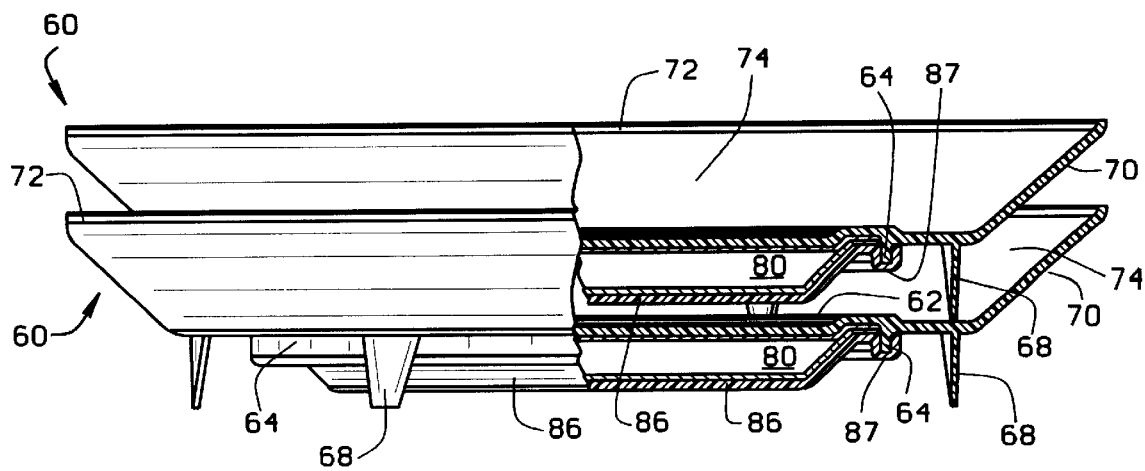
FIG. 11 is a front elevation view in partial section of stacked service bases of FIG. 7.

It can be readily seen in FIG. 11 that the bases 60 are readily stackable with the leg 68 providing enough air space between the bottom 86 of one base and the upper bottom wall 62 of another base.

The service base 60 is insert molded in similar fashion as the service base 20. However, in the service base 60 magnetic pins are used to hold the core 80 in place because the core 80 includes a phase change material that cannot leak out. The liquid plastic during insert molding is formed around the core 80 such that a one-piece unitary service base 60 is formed.

In like manner to the service base 20, the service base 60 is raised to a sufficient temperature through a known induction type heating unit to thereafter dissipate its heat to the plate and the food thereon.

Figure 12:
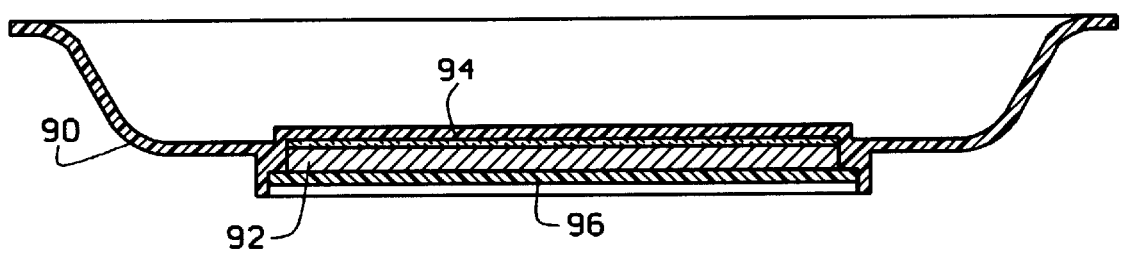
FIG. 12 is a sectional view of the service base with a thin film of glass inserted between the core and the dish.

In both embodiments the short induction cycle heating may cause somewhat uneven heating of the core, with variances in the core temperature of as much as 100° F. This problem can be overcome as shown in FIG. 12. The service base 90 is shown. Between the service base 90 and the core 92 is a thin film of insulation 94, preferably made of a glass type. Testing has shown that a film of glass 1/32 inch in thickness slows the heat transfer process to the outer shell just enough to allow the disk temperature to stabilize at a safe temperature without effecting the total holding ability of the base but enough to prevent spot overheating.

Figure 13:
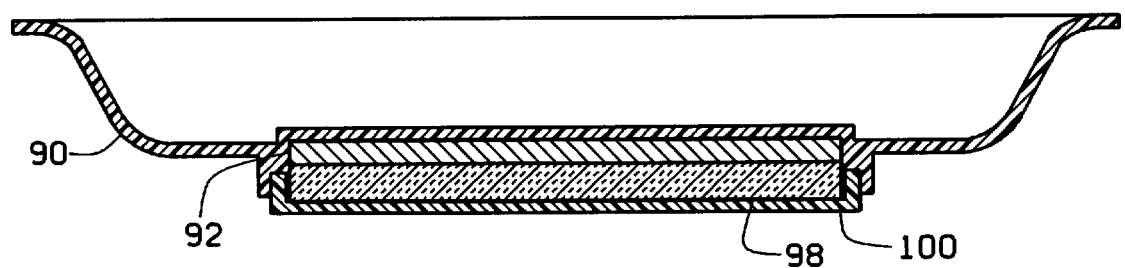
FIG. 13 is a sectional view of the service base with a layer of insulation inserted under the core.

Another problem easily solved with insulation is heating of the bottom of the service base 90. Depending on the application, it is desirable to have the bottom of the service base 90 cooler than the top of the service base 90. This allows easier handling of the base while also directing the heat upward. FIG. 13 shows a layer of insulation 98 added between the core 92 and a modified second bottom wall 100. The modification of the second bottom wall 100 allows the extra room for the insulation 98 within the enclosure for the core 92. It is preferable to use a glass type insulation ranging in thickness from 0.03" to 0.25".

Figure 14:
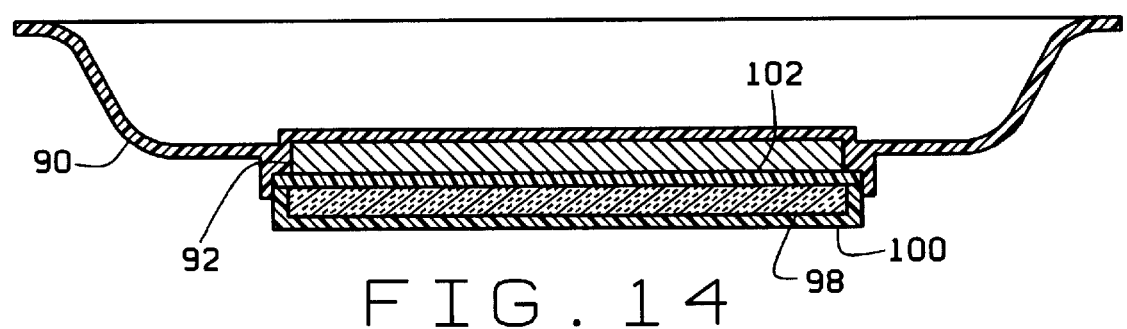
FIG. 14 is a sectional view of the service base of FIG. 13 with an additional separator between the insulation and the core.

FIG. 14 shows a slight deviation to the solution shown in FIG. 13. A separator 102 is added between the core 92 and the insulation 98. This allows the units without insulation to be retrofitted by using the existing bottom of the unit as the separator 102, and then adding the insulation 98 and a second modified bottom 100.

Figure 15:
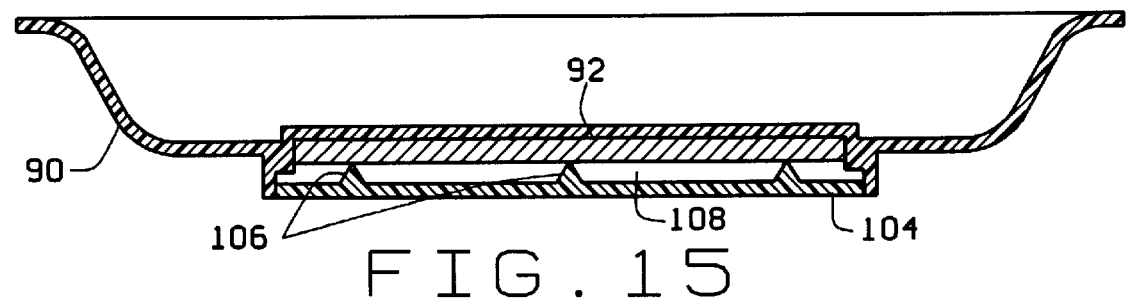
FIG. 15 is a sectional view of the service base with an insulating air gap between the bottom of the service base and the core.

Referring to FIG. 15, an air gap or dead space 108 is shown as an alternative method of insulation. To maintain the dead space below the core 92 a specially modified bottom piece 104 is used which incorporates a plurality of small projections 106. The projections 106 lift the core 92, maintaining contact between the core 92 and the rest of the service base 90.

While the foregoing is directed to the preferred embodiments of the present invention, other and further embodiments of the invention may be devised without departing from the basic scope thereof, and the scope thereof is determined by the claims which follow.

What is claimed is:

1. A food service base comprising:
   a plastic dish sized and configured to receive a plate, said dish including a first bottom wall adapted to be adjacent a bottom of the plate and an annular radially outwardly projecting wall upwardly extending from an upper surface of said first bottom wall;
   a core of a non-metallic, electrically conductive material susceptible to heating by induction heating, said core disposed adjacent a lower surface of said first bottom wall; and
   a second bottom wall integrally formed with said dish and surrounding said core.

2. The food service base of claim 1, wherein said core is made of graphite.

3. The food service base of claim 1, wherein said core is made of a graphite and ceramic composite.

4. A food service base comprising:
   a plastic dish sized and configured to receive a plate, said dish including a first bottom wall adapted to be adjacent a bottom of the plate and an annular radially outwardly projecting wall upwardly extending from an upper surface of said first bottom wall;
   a core of material susceptible to heating by induction heating, said core disposed adjacent a lower surface of said first bottom wall;
   a film of insulation disposed between said core and said dish;
   a second bottom wall integrally formed with said dish and surrounding said core and said film; and
   wherein said film is made of glass.

5. A food service base comprising:
   a plastic dish sized and configured to receive a plate, said dish including a first bottom wall adapted to be adjacent a bottom of the plate and an annular radially outwardly projecting wall upwardly extending from an upper surface of said first bottom wall;
   a rim annularly projecting from a lower surface of said first bottom wall;
   a second bottom wall matingly received by said rim, thereby forming an enclosure;
   a core of a material susceptible to heating by induction heating, said core disposed within said enclosure, adjacent the lower surface of said first bottom wall;
   an insulation layer disposed within said enclosure adjacent to a lower surface of said core; and
   wherein said insulation layer is made of glass.

6. A food service base comprising:
   a plastic dish sized and configured to receive a plate, said dish including a first bottom wall adapted to be adjacent a bottom of the plate and an annular radially outwardly projecting wall upwardly extending from an upper surface of said first bottom wall;
   a rim annularly projecting from a lower surface of said first bottom wall;
   a second bottom wall matingly received by said rim, thereby forming an enclosure;
   a core of a material susceptible to heating by induction heating, said core disposed within said enclosure, adjacent the lower surface of said first bottom wall;
   an insulation layer disposed within said enclosure adjacent to a lower surface of said core; and
   a plastic separator disk, said separator disk disposed within said enclosure between said core and said insulation layer.

7. A food service base comprising:
   a plastic dish sized and configured to receive a plate, said dish including a first bottom wall adapted to be adjacent a bottom of the plate and an annular radially outwardly projecting wall upwardly extending from an upper surface of said first bottom wall;
   a rim annularly projecting from a lower surface of said first bottom wall;
   a second bottom wall matingly received by said rim, thereby forming an enclosure;

a core of a material susceptible to heating by induction heating, said core disposed within said enclosure, adjacent the lower surface of said first bottom wall;

an insulation layer disposed within said enclosure adjacent to a lower surface of said core, wherein said insulation layer is made of air; and a plurality of supports upwardly projecting from an upper surface of said second bottom wall, said supports maintaining contact between said core and the lower surface of said first bottom wall.

8. A food service base comprising:

a ceramic dish sized and configured to receive a plate, said dish including a first bottom wall adapted to be adjacent a bottom of the plate and an annular radially outwardly projecting wall upwardly extending from an upper surface of said first bottom wall;

a core of a material susceptible to heating by induction heating, said core disposed adjacent a lower surface of said first bottom wall; and a second bottom wall integrally formed with said dish and surrounding said core.

9. The food service base of claim 8, wherein the material forming the core is embedded within said ceramic dish, said core forming a single solid unit susceptible to heating by induction heating.

* * * * *